UNITED STATES PATENT OFFICE.

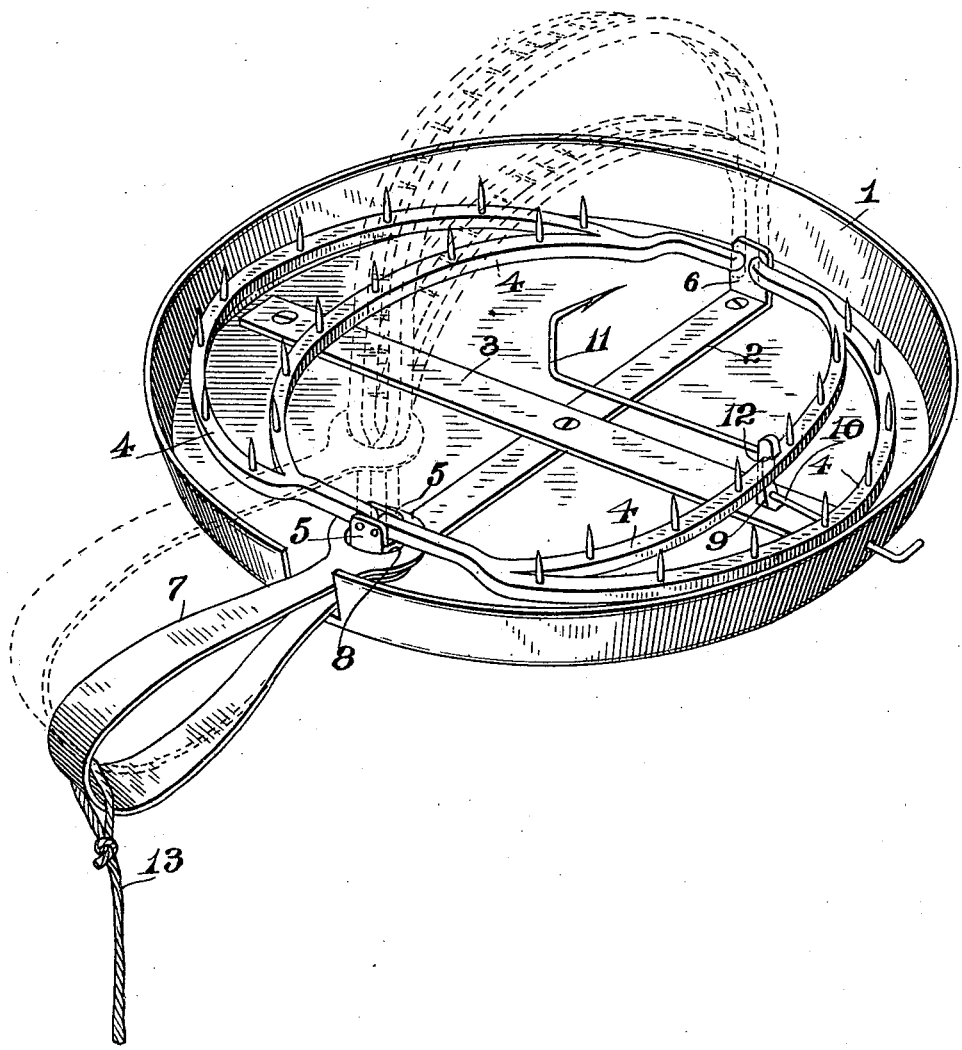

JOHN EVANS, OF BRIDGEPORT, CONNECTICUT, ASSIGNOR OF ONE-HALF TO DANIEL CAMPBELL, OF SAME PLACE.

FISH-TRAP.

SPECIFICATION forming part of Letters Patent No. 621,643, dated March 21, 1899.

Application filed November 28, 1898. Serial No. 697,666. (No model.)

*To all whom it may concern:*

Be it known that I, JOHN EVANS, a citizen of the United States, residing at Bridgeport, in the county of Fairfield and State of Connecticut, have invented certain new and useful Improvements in Fish-Traps; and I do hereby declare the following to be a full, clear, and exact description of the invention, such as will enable others skilled in the art to which it appertains to make and use the same.

My invention relates to traps, but has particular reference to traps which are baited and are used under water for the purpose of catching fish.

The main object of my invention is to provide a trap of this description which can be thrown overboard and will sink to the bottom and rest on the latter without turning upside down; and with these ends in view my invention consists in the details of construction and combination of parts such as will be hereinafter fully set forth and then specifically designated by the claim.

The accompanying drawing, which forms a part of this application, shows a perspective view of my improved trap as it appears when set and ready for use, the closed position being denoted by dotted lines.

Heretofore traps with spring-jaws, the latter with or without spurs, have been used, and I do not therefore wish to be understood as laying any claim for novelty to the general construction of trap which I have shown, since my improvement is specific in its nature and contemplates the use of any suitable trap of the description shown.

1 is a metallic pan having flaring sides, and 2 3 are cross-pieces secured to the inside of the bottom of said pan.

4 are jaws pivoted at their extremities within uprights 5 6, which rise from the cross-piece 2, and 7 is a V-spring, one extremity of which is confined to the upright 5 beneath the pivotal points of the jaws at one end, while the other end of said spring is provided with an opening 8, through which latter the jaws extend above said pivotal points, as shown in dotted lines.

This style of trap is of course old, and to permit the distention of the jaws it is merely necessary to compress the spring and to hold the jaws in distended position by means of any suitable trigger, so that when the latter is sprung the recovery of the spring will effect the snapping together of the jaws.

I have provided a trigger mechanism for setting the trap which is exceedingly efficient and is peculiarly adapted for use in connection with a fish-trap, which mechanism I will now describe.

To the cross-piece 3 I connect the post 9, at the bottom thereof, in such manner that said post is capable of a free rocking movement, and from this post extend the setting-trigger 10 and the bait-hook 11. This post 9 is wholly within the confines of one of the jaws when the latter is in distended condition and is provided with a shoulder 12, and when the jaws of the trap are distended the post is manipulated by means of the trigger 10 until the shoulder 12 is hooked over the inner edge of the adjacent jaw, and then the trap is in "set" condition. The slightest disturbance of the bait-hook will cause the post to be pulled away from the jaw, and both jaws will then be snapped together by the action of the spring.

By mounting the trap within the bottom of a metal dish said trap may be thrown overboard and in sinking will always preserve a proper position with the dish lowermost, especially if more or less flare be given to the sides of the dish.

In using my trap where there are strong running tides or considerable disturbance of the water the bottom of the pan may be weighted by means of a flat sheet of lead, if desired, although under ordinary circumstances weighting is unnecessary. A stout cord or rope 13 is attached to the closed end of the spring for the obvious purpose of keeping the trap within the control of the fisherman.

Having thus described my invention, what I claim as new, and desire to secure by Letters Patent, is—

In a trap for fish, the combination of the pan with flaring sides, the cross-pieces secured to the inside of the bottom of said pan, the jaws having their extremities pivoted to one of these cross-pieces, the shouldered post attached to the other cross-piece and wholly within the confines of one of the jaws when in distended condition and capable of a free rocking movement and having extending therefrom in opposite directions the bait-hook and setting-trigger, and the V-spring one end of which is secured to the first-named crosspiece below the pivotal points of the jaws while the other extremity of said spring is provided with an opening through which said jaws extend above said pivotal points, substantially as set forth.

In testimony whereof I affix my signature in presence of two witnesses.

JOHN EVANS.

Witnesses:
  F. W. SMITH, Jr.,
  M. T. LONGDEN.